J. T. BROWN & J. W. COLBERT.
CHURN.

No. 175,023. Patented March 21, 1876.

WITNESSES:

INVENTOR:
J. T. Brown
J. W. Colbert
BY

ATTORNEYS.

UNITED STATES PATENT OFFICE.

JOHN T. BROWN, OF MORRISVILLE, AND JOSEPH W. COLBERT, OF FREDERICKSBURG, VIRGINIA.

IMPROVEMENT IN CHURNS.

Specification forming part of Letters Patent No. 175,023, dated March 21, 1876; application filed February 23, 1876.

*To all whom it may concern:*

Be it known that we, JOHN T. BROWN, of Morrisville, in the county of Fauquier and State of Virginia, and JOSEPH W. COLBERT, of Fredericksburg, in the county of Spottsylvania and State of Virginia, have invented a new and Improved Churn; and we do hereby declare that the following is a full, clear, and exact description of the same, reference being had to the accompanying drawing, forming a part of this specification, in which—

Figure 1:
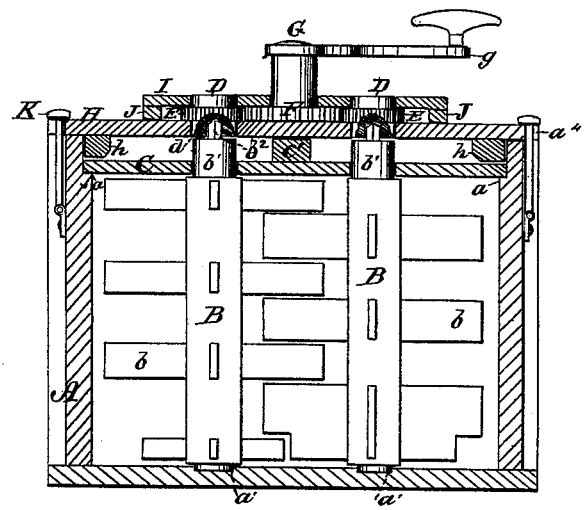
Figure 2:
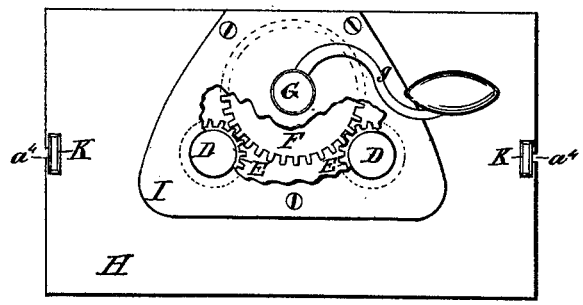

Figure 1 is a vertical section; Fig. 2, a plan view, showing gear-wheels.

The invention consists in a churn whose vertical shafts are provided with a bearing-plate, that also serves the purpose of preventing the milk or cream from spattering out.

A represents the vessel that receives the cream or milk, which has a shoulder, $a$, on the inside, and a little below the upper edge, while in the bottom, and at preferably an equal distance from each end, are located the step-bearings $a^1$ $a^1$. In the latter are journaled the lower ends of two vertical shafts, B, that have at right angles thereto several paddles, $b$, those of one extending nearly to the other shaft, and being arranged so as to pass in their rotations over one another. On the upper end of shafts B are formed journals $b^1$, over which passes the bearing-plate C, that also serves to prevent the milk or cream from slopping out while it rests upon the shoulder $a$ of vessel. The shafts B have squared or angular ends $b^2$, that fit into the corresponding sockets $d$ of shafts D, that are rotated by pinions E. These two pinions E E are actuated by a large wheel, F, whose shaft G is provided with a hand-crank, $g$. The shafts D D G and wheels E E F are located between the cover H and a superposed plate, I, separated by the edge spacing block or piece J. Thus, the operative mechanism and the churn-cover are compactly made into one detachable part of the churn, and by placing the sockets $d$ over ends $b^2$ the shafts B B may be rapidly revolved in opposite directions, so as to make two counteracting currents. The cover H and bearing-plate C are held apart by the end cross-bars $h$ $h$ on one, and the middle cross-bar $c'$ on the other. In each end of cover, and preferably at about the middle, we make an open slot, $a^4$, and to the end of vessel we pivot the lower end of a T-bolt, K, so that by turning the bolts until the heads assume a perpendicular position, the cover and mechanism are securely fastened to the churn.

Having thus described our invention, what we claim as new is—

The combination, with a churn-body and one or more vertical dasher-shafts, of the bearing-plate C, arranged under the cover, over the dasher-shafts, and on an inside shoulder of vessel, as and for the purpose specified.

JOHN T. BROWN.
JOSEPH W. COLBERT.

Witnesses:
S. BROOKE DANIEL,
O. N. WILLIAMS.